United States Patent [19]
Parker et al.

[11] 3,941,452
[45] Mar. 2, 1976

[54] MICROSCOPES

[75] Inventors: Bernard I. Parker, Warren; Charles W. Caldwell, Cortland, both of Ohio

[73] Assignee: Parco Scientific Inc., Warren, Ohio

[22] Filed: Sept. 12, 1972

[21] Appl. No.: 288,371

Related U.S. Application Data

[63] Continuation of Ser. No. 95,287, Dec. 4, 1970, abandoned.

[52] U.S. Cl. .................... 350/82; 350/33; 350/87
[51] Int. Cl.² ........................................ G02B 21/26
[58] Field of Search ............. 350/82, 86, 87, 33, 35, 350/80

[56] References Cited
UNITED STATES PATENTS

| | | | |
|---|---|---|---|
| 1,650,646 | 11/1927 | Ott........................................ | 350/35 |
| 2,157,157 | 5/1939 | Anketell ............................ | 350/87 X |
| 2,427,256 | 9/1947 | Butscher............................ | 350/33 X |
| 2,427,689 | 9/1947 | Osterberg et al. ................. | 350/87 X |
| 3,064,529 | 11/1962 | Straat................................. | 350/80 X |
| 3,259,012 | 7/1966 | Locquin.............................. | 350/87 |
| 3,565,512 | 2/1971 | Peck .................................. | 350/39 X |
| 3,582,178 | 6/1971 | Boughton et al. ................. | 350/33 X |

*Primary Examiner*—David H. Rubin
*Attorney, Agent, or Firm*—Michael Williams

[57] ABSTRACT

A new microscope construction wherein the large components may be made in quantity using plastic molding techniques. The improved microscope comprises a base of inverted dish shape, a bridge comprising a plurality of legs, and an eye-piece housing. The lower end of each leg is connected to the base and the upper ends of the legs are joined to form a support for the eye-piece housing. A stage is supported by a central portion of the base for vertical adjustment and a single beam-splitting prism is carried by the eye-piece housing, the latter having a pair of diverging eye-piece tubes, each having mirrors cooperating with the prism.

4 Claims, 7 Drawing Figures

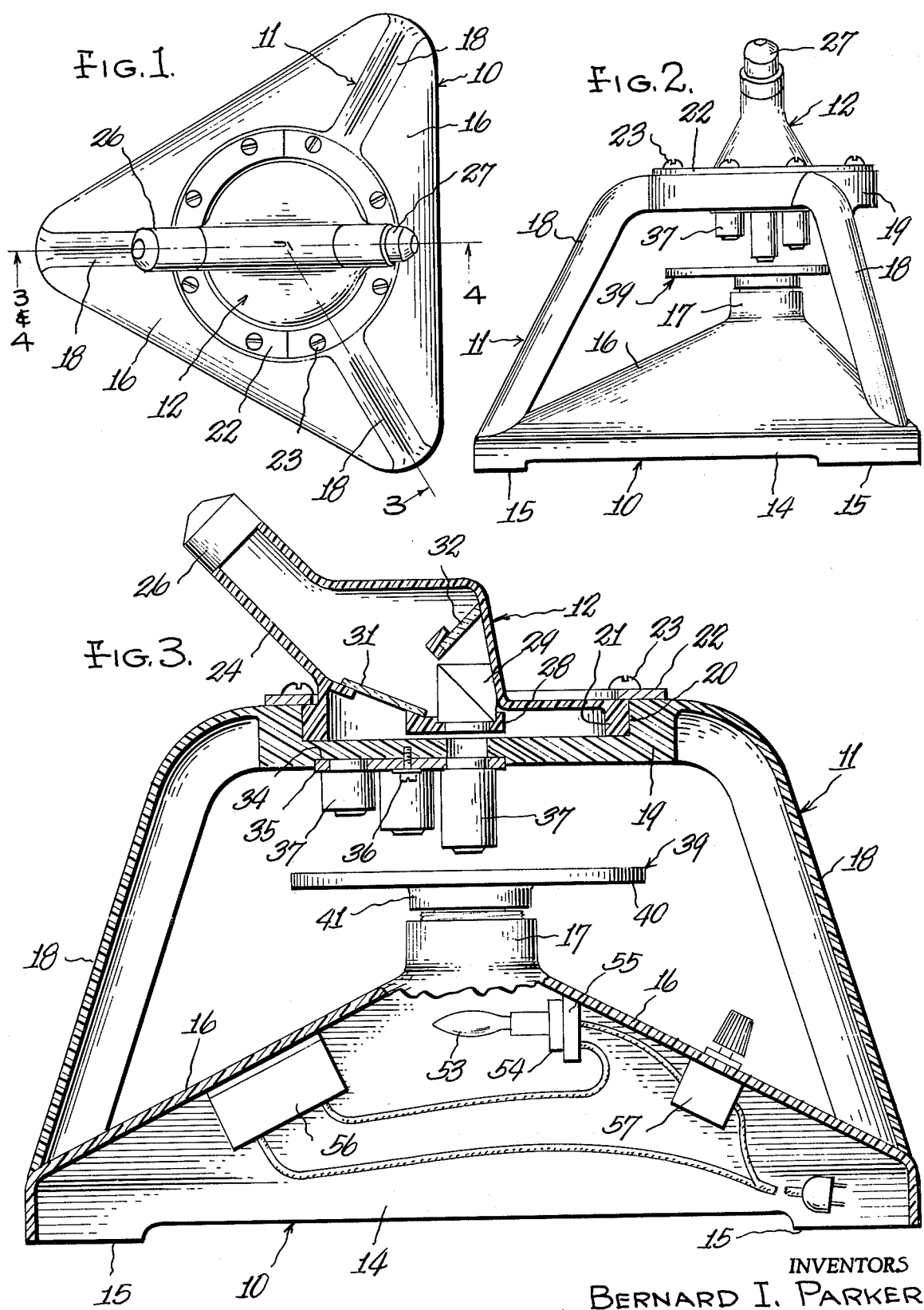

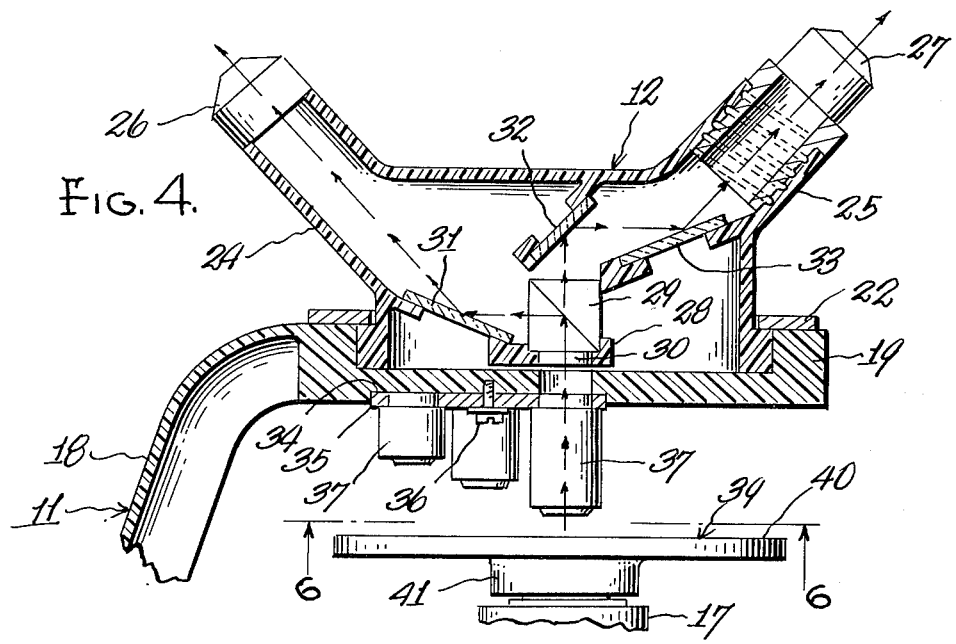
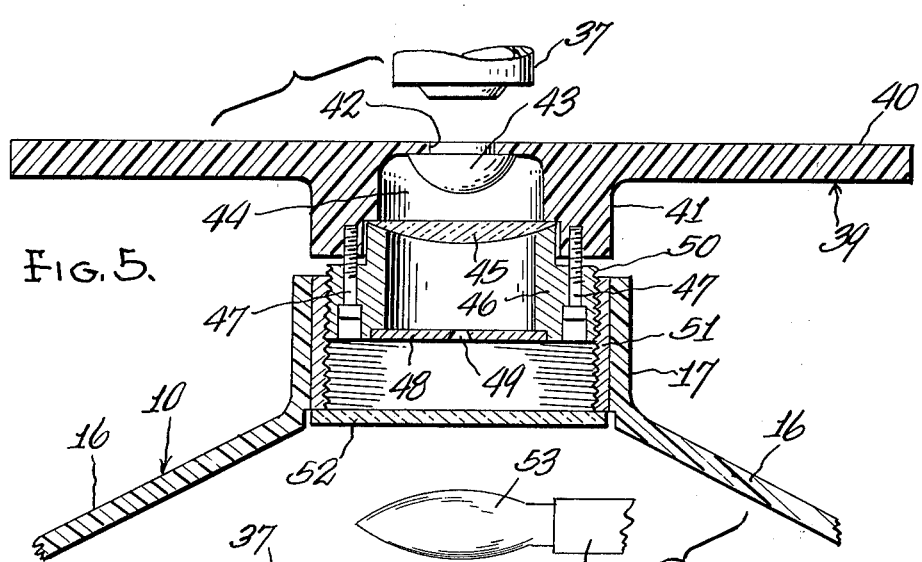
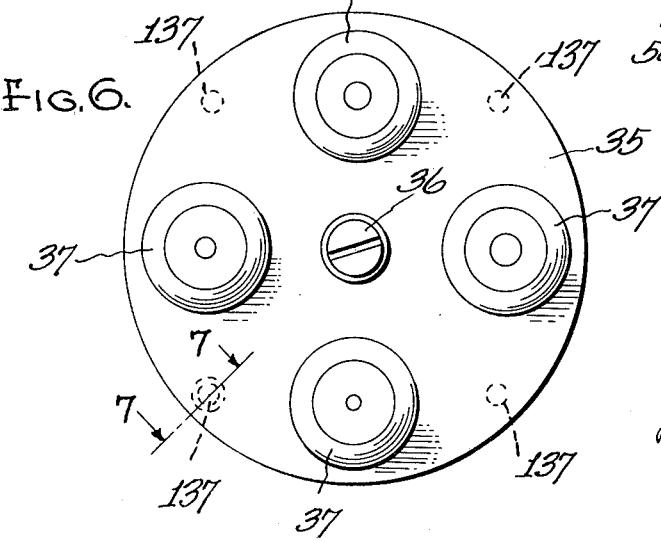
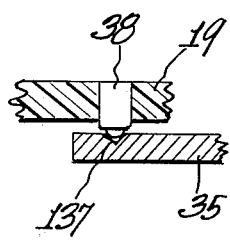

MICROSCOPES

This is a continuation of application Ser. No. 95,287 filed Dec. 4, 1970 now abandoned.

BACKGROUND AND SUMMARY

Most of the microscopes of the prior art known to us are made of conventional construction, and are made of parts which required accurate machining, and thus were relatively expensive to manufacture.

Our invention enables a reduction in cost of manufacture since major components may be made in quantity by plastic molding techniques, yet without sacrificing in quality of manufacture.

Further, our improved microscope possesses stability in support, ease of operation and esthetic appeal, not possible with conventional microscopes.

Accordingly, it is a principal object of our invention to provide new and improved microscopes possessing all the advantages of the conventional manufacture, but without the disadvantages inherent therein.

DESCRIPTION OF THE DRAWINGS

In the drawings accompanying this description and forming a part of this specification, there is shown, for purposes of illustration, an embodiment which our invention may assume and in these drawings:

FIG. 1 is a top plan view of our improved microscope,

FIG. 2 is a side elevational view thereof,

FIG. 3 is an enlarged sectional view corresponding to the line 3—3 of FIG. 2,

FIG. 4 is an enlarged, fragmentary sectional view corresponding to the line 4—4 of FIG. 1, FIG. 5 is an enlarged fragmentary sectional view of the stage construction, FIG. 6 is an enlarged fragmentary view corresponding to the line 6—6 of FIG. 4, and FIG. 7 is an enlarged fragmentary sectional view corresponding to the line 7—7 of FIG. 6.

DESCRIPTION OF THE PREFERRED EMBODIMENT

Our microscope comprises a base 10, a bridge 11 and an eyepiece housing 12 which may be formed of any suitable material and are preferably made of a high strength, high impact plastic similar to that of which telephone housings are made, so as to make it possible to injection mold the same. As herein shown, the base is triangular in plan although it may take any other suitable shape.

The base 10 comprises a lower portion 14 formed with feet 15 at the three corners, the upper portion of the base being formed by upwardly and inwardly sloping walls 16 which merge in a cylindrical neck 17. The bridge 11 includes three legs 18 (when the base is triangular), each leg being generally U-shaped in cross-section. The lower part of each leg is formed to closely follow the contour of a respective corner of the base and each lower part is connected to the base, preferably by means of a suitable plastic cement. The upper parts of the legs 18 merge into an integral boss 19, as clearly seen in FIGS. 3 and 4. The base and bridge, as thus connected, form a sturdy support for the microscope apparatus.

The boss 19 is formed with a circular recess 20 opening inwardly from its upper surface to closely receive a ring 21 formed as an integral part of the eye piece housing 12. The ring 21 is held seated within the recess 20 upon a radially inwardly extending flange portion of said boss by means of a ring-like plate 22 which is held to the upper surface of the boss 19 by screws 23 and which has its inner peripheral portion overlying the upper surface of the ring. The plate 22 is made in two section pieces so that it may be easily assembled. The diamensional tolerance between the ring 21 and the wall of the recess 20 is such that the eye-piece housing 12 is held to accurate but relatively free rotation.

The eye-piece housing includes two integrally formed eye-piece tubes 24, 25 which are disposed in aligned manner, as seen in FIG. 1, but which extend upwardly and diverge from the ring 21, as seen in FIG. 4. The tube 24 has a fixed eye-piece 26, whereas the eye-piece 27 is threaded in the tube 25 for adjustment purposes.

The eye-piece housing 12 has a central boss 28 which is integrally joined to the ring 21 by means of ribs (not shown). A beam splitting prism 29 has a lower portion 30 secured within a central opening in the boss 28, as by cement or a force fit. Mirrors 31, 32 and 33 are carried by ledges formed as integral parts of the eye-piece housing, and are positioned to cooperate with the prism 29 to direct light rays in the manner shown by the arrows in FIG. 4.

The undersurface of the boss 19 is formed with a circular recess 34 to receive a circular plate 35 which may be formed of a metal, such as aluminum. A screw 36 is threaded into the boss 19 and holds the plate 35 thereto, and also forms the axis of rotation of the plate. A plurality of objective lens holders 37, four in number in the present embodiment, are carried by the plate 35 and depend therefrom, to provide a range of magnification power. The plate 35 may be rotated to axially align any one of the lens holders 37 with the prism and with the central aperture in the flange portion of boss 19. As seen in FIGS. 6 and 7, the upper surface of the plate 35 is formed with four equidistantly spaced recesses 137. A ball detent 38 is carried by the boss 19 and is releasably seated in any one of the recesses 137 to thereby hold the plate 35 in selected position.

A stage 39 comprises a circular plate 40 having a flat upper surface upon which the specimen to be examined is supported. The plate 40 has a central circular boss 41 extending from its undersurface. The boss 41 has a central opening 42 in which is secured, as by cementing, a portion of a condensing lens 43 which projects into a central recess 44. The recess terminates in an annular shoulder against which the periphery of condensing lens 45 is clamped by means of a plug 46 which may be formed of a suitable material, such as brass.

The plug 46 is held assembled with the boss 41 by a plurality of screws 47, as seen in FIG. 5. The lower end of the plug is recessed and an opaque disc 48 is cemented in place in the recess, the disc having a fixed aperture 49. The plug is provided with external screw threads 50 which engage internal threads formed on a sleeve 51 which is desirably formed of brass to be compatible with the brass plug. The sleeve 51 may have ribs or lugs (not shown) embedded in the neck 17 to hold the sleeve against rotation. Secured to the lower end of the sleeve 51, as by cement or other suitable fastening means, is a dispersing lens 52.

As seen in FIGS. 3 and 5, an electric light bulb 53 is carried by a socket 54 supported from a bracket 55 on the undersurface of wall 16 of the base. The bulb is so disposed that light therefrom passes upwardly through the dispersing lens and the remaining optical system of the microscope. A transformer 56 is mounted on the undersurface of the base wall 16, as is a control switch 57, suitable electrical connections being made to a source of electrical power.

In use, a specimen to be examined is placed on the upper surface of the stage to overlie the condensing lens 43. The switch 57 is operated to energize the light 53 and the plate 35 is rotated to align the desired objective lens 37 in the optical system. A person looking through the fixed eye-piece 26 may rotate the stage 39 to lower or elevate the same until the specimen is in focus. Thereafter, another person may look through the eye-piece 27, and may rotate it for focus, if necessary.

We claim:

1. A microscope comprising:

a base formed as a hollow inverted dished pyramidal member, said base being substantially triangular in plan and having a central upwardly extending tubular portion, a bridge extending upwardly from said base and having three legs, each leg having its lower end fixedly connected to said base at a corner thereof, the upper portions of said legs being joined to a horizontally disposed boss having a central opening circular recess aligned with and spaced upwardly from said central tubular portion, an objective lens mounted in a holder carried by the underside of said horizontally disposed boss, a stage plate having a central depending externally threaded tubular portion engaging internal threads formed in said central tubular portion of said base to effect vertical adjustment of said stage plate by rotation thereof, said depending tubular portion of said stage plate carrying condensing lens means aligned with said objective lens, a light source mounted inside said base and supported from a wall thereof in alignment with said condensing lens means for illuminating a specimen on said stage plate, an eyepiece housing extending upwardly from said bridge, said eyepiece housing having a ring at its lower portion which seats within said circular recess for rotation, means retaining said ring in said circular recess, and, said eyepiece housing having an angled eyepiece tube and an internal prism and mirror to direct light from said objective lens to said eyepiece tube.

2. The microscope of claim 1 wherein said eyepiece housing includes a second angled eyepiece tube and mirror, and said prism is a beam-splitting prism to direct light to both eyepiece tubes, said eyepiece tubes being disposed at an angle to each other sufficient to permit simultaneous respective use of the eyepiece tubes by two persons.

3. The microscope of claim 2 wherein one of said eyepiece tubes includes an adjustable lens element.

4. The microscope of claim 1 wherein said base, bridge, boss and eyepiece housing are respectively formed from rigid plastic material.

* * * * *